(12) United States Patent
Ginter et al.

(10) Patent No.: US 12,238,245 B1
(45) Date of Patent: Feb. 25, 2025

(54) METHODS FOR EMERGENCY RESPONSE LOCATION (ERL) PROVISION IN A VOICE OVER INTERNET PROTOCOL (VOIP) 911 SERVER FOR NON-DIRECT INWARD DIALING (DID) CALLERS AND RELATED SYSTEMS AND COMPUTER PROGRAM PRODUCTS

(71) Applicant: Bandwidth Inc., Raleigh, NC (US)

(72) Inventors: Thomas Ginter, Allen, TX (US); Austin Bello, Raleigh, NC (US)

(73) Assignee: Bandwidth Inc., Raleigh, NC (US)

( * ) Notice: Subject to any disclaimer, the term of this patent is extended or adjusted under 35 U.S.C. 154(b) by 0 days.

(21) Appl. No.: 18/385,483

(22) Filed: Oct. 31, 2023

(51) Int. Cl.
| | |
|---|---|
| H04M 3/51 | (2006.01) |
| H04L 65/1045 | (2022.01) |
| H04L 65/1069 | (2022.01) |
| H04L 65/1096 | (2022.01) |
| H04L 65/1104 | (2022.01) |
| H04M 3/523 | (2006.01) |
| H04M 3/64 | (2006.01) |

(52) U.S. Cl.
CPC ....... *H04M 3/5116* (2013.01); *H04L 65/1045* (2022.05); *H04L 65/1069* (2013.01); *H04L 65/1096* (2013.01); *H04L 65/1104* (2022.05); *H04M 3/5231* (2013.01); *H04M 3/64* (2013.01)

(58) Field of Classification Search
CPC ............. H04L 65/1045; H04L 65/1069; H04L 65/1096; H04L 65/1104; H04M 3/5116; H04M 3/5231; H04M 3/64
See application file for complete search history.

(56) References Cited

U.S. PATENT DOCUMENTS

| | | | | |
|---|---|---|---|---|
| 8,289,953 | B2* | 10/2012 | Ray | H04L 61/5014 |
| | | | | 379/142.04 |
| 8,385,881 | B2* | 2/2013 | Zhu | H04W 4/90 |
| | | | | 455/404.1 |
| 11,159,676 | B1* | 10/2021 | Ginter | H04L 65/1053 |
| 11,974,207 | B2* | 4/2024 | Katz | H04M 3/42161 |
| 2003/0086538 | A1* | 5/2003 | Geck | H04M 3/42314 |
| | | | | 379/45 |
| 2003/0148757 | A1* | 8/2003 | Meer | H04M 1/715 |
| | | | | 455/551 |
| 2008/0063153 | A1* | 3/2008 | Krivorot | H04M 11/04 |
| | | | | 379/45 |
| 2009/0290577 | A1* | 11/2009 | Epley | H04L 65/1101 |
| | | | | 370/352 |

(Continued)

*Primary Examiner* — Marcus Smith
*Assistant Examiner* — Kai Chang
(74) *Attorney, Agent, or Firm* — Gregory Stephens (57) ABSTRACT

Methods for providing a call-back number for emergency calls initiated from a non-DID device are provided. The methods include receiving a call from a public safety answering point (PSAP) at an application programming interface (API) associated with a carrier, wherein a PSAP operator calls a proxy call-back number on a PSAP screen that has been previously assigned to a non-DID device; requesting instructions at the API from a control function based on the proxy call-back number dialed by the PSAP operator; receiving information at the API related to the non-DID device from the control function based on pre-provisioned data associated with the proxy call-back number; and routing the call from the PSAP to the non-DID device through a voice over internet protocol (VOIP) switch.

20 Claims, 5 Drawing Sheets

(56) References Cited

U.S. PATENT DOCUMENTS

| | | | |
|---|---|---|---|
| 2011/0065416 A1* | 3/2011 | Burt | H04L 12/6418 |
| | | | 455/404.2 |
| 2015/0092537 A1* | 4/2015 | Biage | H04M 3/5116 |
| | | | 370/220 |
| 2015/0181033 A1* | 6/2015 | Keller | H04L 65/1036 |
| | | | 455/404.1 |
| 2016/0014587 A1* | 1/2016 | Hines | H04W 4/029 |
| | | | 455/404.2 |
| 2016/0337831 A1* | 11/2016 | Piett | H04M 3/42357 |
| 2022/0174465 A1* | 6/2022 | Pagonis | H04M 3/5116 |
| 2022/0210272 A1* | 6/2022 | Horelik | H04W 4/021 |
| 2023/0034158 A1* | 2/2023 | Anderson | H04M 3/42195 |
| 2023/0144916 A1* | 5/2023 | Anderson | H04M 3/42195 |
| | | | 379/45 |
| 2024/0388657 A1* | 11/2024 | Fucci | H04M 3/42374 |

* cited by examiner

METHODS FOR EMERGENCY RESPONSE LOCATION (ERL) PROVISION IN A VOICE OVER INTERNET PROTOCOL (VOIP) 911 SERVER FOR NON-DIRECT INWARD DIALING (DID) CALLERS AND RELATED SYSTEMS AND COMPUTER PROGRAM PRODUCTS

FIELD

The present inventive concept generally relates to emergency calls and, more particularly, to enhanced emergency calling or "E911" for Voice over Internet Protocol (VoIP) Systems received from non-direct inward dialing (DID) callers.

BACKGROUND

911 Emergency calls are, by definition, time sensitive and may be a matter of life or death. The 911 operator (911 call taker or public safety personnel) must be able to communicate with the 911 caller, know exactly where the 911 caller is physically located and be able to call the 911 caller back if the call is disconnected for any reason. An increasing number of users (callers) are using Voice over Internet Protocol (VoIP) platforms, rather than legacy plain old telephone service (POTS) to make telephone calls. To provide customary 911 calling service to a call made using a VOIP platform, the platform needs to send the emergency call to a 911 Access service, for example, services provided by a carrier, such as Bandwidth. The emergency call is generally sent in the form of a Session Initiation Protocol (SIP) INVITE that identifies the called party as "911" and the calling party as a unique, for example, North American Numbering Plan (NANP) telephone number (TN). The 911 service provider (for example, Bandwidth) processes this call by fetching the pre-stored address associated with the unique calling party TN and using that address data to route the call to the correct destination Public Safety Answering Point (PSAP). The standard process for handling a VoIP 911 Call is illustrated in FIG. 1.

Figure 1:
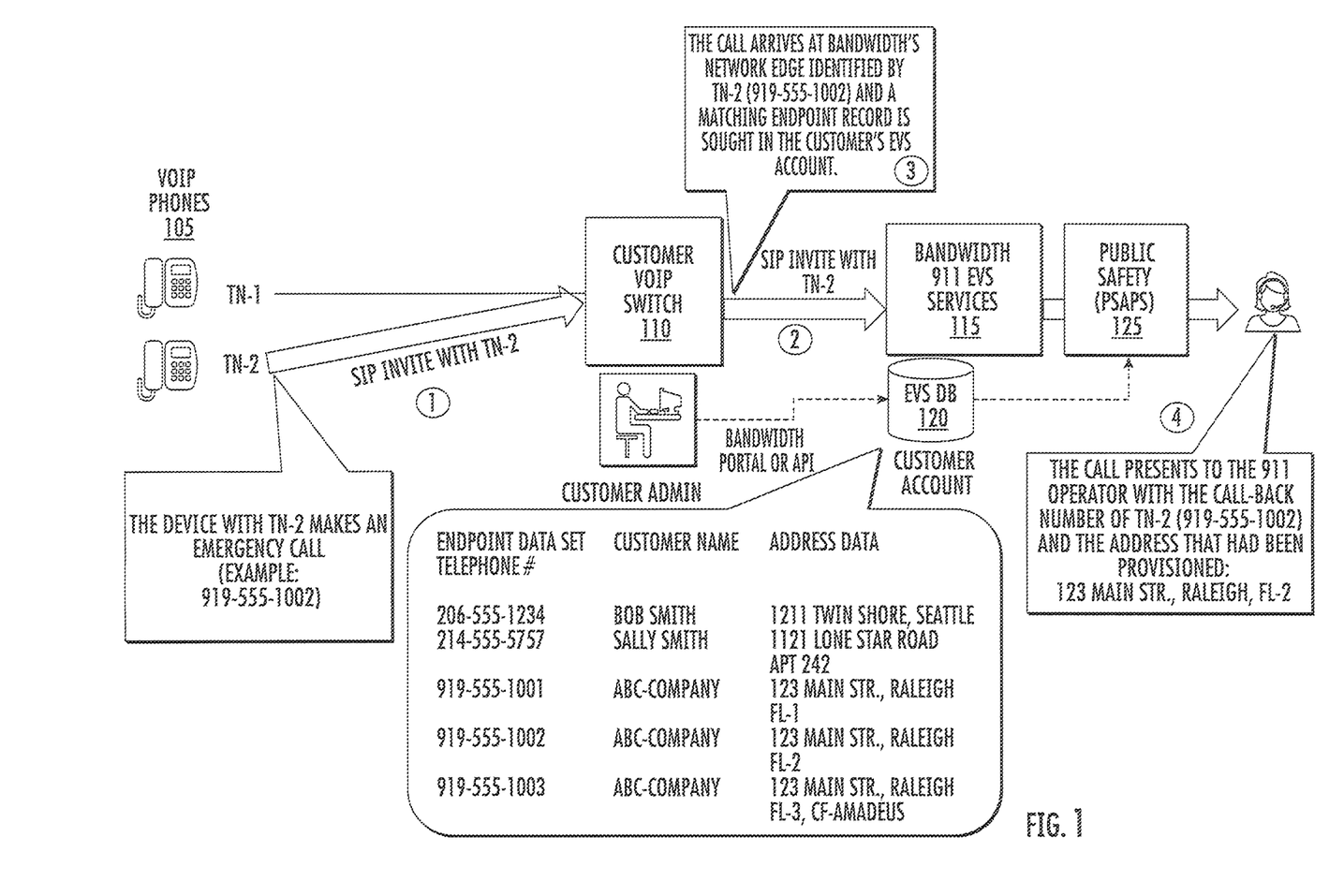
FIG. 1 is a basic block diagram illustrating a VoIP 911 call made from a device that has an associated telephone number (TN).

Briefly, as illustrated in FIG. 1, a VoIP device 105, in this example, a VoIP phone, initiates a 911 call which is sent in the form of a SIP invite including a TN (1). The TN is TN-2 (919-555-1002) in this example. The SIP invite is sent to and received by a Customer VoIP Switch 110 (2). The call arrives at a service provider's network (for example, bandwidth) and is identified by the TN-2 and a matching endpoint record is located in the Customer's EVS database 120. As illustrated, in the endpoint data set managed by the customer admin, the TN 919-555-1002 (TN-2) belongs to Customer ABC-Company and is located at 123 Main Street, Raleigh, Floor 2 (3). This information is then provided from the 911 EVS services 115 to the 911 operator at the Public Safety Answering Point (PSAP) 125 (4). In the final delivery of the 911 call to the PSAP, the 911 service displays to the PSAP Call Taker (911 operator) the user's unique TN, validated address and name (often the business name). Should the emergency call be disconnected or dropped for any reason, the 911 operator gains the benefit of having the current address of the caller upon their display screen as well as the unique TN to call-back to the user. However, VoIP 911 calls can also be made from devices that do not have an associated TN or DID, i.e., non-DID callers. In these situations, the 911 operator does not have a call back number TN to use if the emergency call gets disconnected.

SUMMARY

Some embodiments of the present inventive concept provide methods for providing a call-back number for emergency calls initiated from a non-DID device. The methods include receiving a call from a public safety answering point (PSAP) at an application programming interface (API) associated with a carrier, wherein a PSAP operator calls a proxy call-back number on a PSAP screen that has been previously assigned to a non-DID device; requesting instructions at the API from a control function based on the proxy call-back number dialed by the PSAP operator; receiving information at the API related to the non-DID device from the control function based on pre-provisioned data associated with the proxy call-back number; and routing the call from the PSAP to the non-DID device through a voice over internet protocol (VOIP) switch.

In further embodiments, receiving the call from the PSAP may further include receiving the call at a PSTN from the PSAP and routing the call from the PSTN to the API of the carrier.

In still further embodiments, routing the call from the PSAP to the non-DID device through the VOIP switch may further include routing the call using a session initiation protocol (SIP) invite wherein a TO field in the SIP invite is set to a user identifier associated with the proxy number.

In some embodiments, routing the call may be followed by connecting the call from the PSAP with the non-DID device.

In further embodiments, the method may further include pre-provisioning data at the control function to facilitate providing a call-back number for a non-DID device. Pre-provisioning may include assigning a unique identifier and a corresponding geolocation to each non-DID device; providing assigned unique identifiers and geolocations to the control function; storing the unique identifiers and the corresponding geolocations at the control function; provisioning the stored unique identifiers and geolocations at the carrier; and creating and storing a set of proxy call-back numbers at the API of the carrier, the set of proxy call-back numbers to be used for future emergency calls initiated from non-DID numbers.

In still further embodiments, the method may further include provisioning the stored unique identifiers and the corresponding geolocations at an ECAPI at the carrier.

In some embodiments, pre-provisioning may be followed by and receiving the call from the PSAP may be preceded by receiving an emergency call at the carrier from the VOIP switch using a SIP invite, the non-DID device having a unique identifier and corresponding geolocation assigned thereto; obtaining the proxy call-back number from the set of proxy call-back numbers and assigning the proxy call-back number to the emergency call having the unique identifier and corresponding geolocation; and providing the call to the PSAP operator and displaying the geolocation and the assigned proxy call-back number to the PSAP operator.

Related systems and computer program products are provided.

DETAILED DESCRIPTION OF EMBODIMENTS

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items. Similarly, as used herein, the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Reference will now be made in detail in various and alternative example embodiments and to the accompanying figures. Each example embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

As discussed above, when a VoIP 911 call is made from a device having an associated telephone number, the system can function and the 911 operator is presented with the call back number of the caller and the physical address of the 911 caller. However, this call flow is compromised when the device used by the 911 caller is not identified by a unique TN, i.e., a direct inward dialing (DID) number. A "non-DID" identifier cannot be displayed to the 911 operator at the PSAP as discussed above with respect to FIG. 1. Thus, a call back number is not available to be dialed by the 911 operator to facilitate the reconnection of a potentially dropped/disconnected call. Furthermore, since there is no unique DID, the customary storage of a per-DID address in the EVS database cannot be accomplished.

Many solutions have been implemented to overcome the difficulties presented by the non-DID 911 caller situation. However, with the introduction of RAY BAUM's Act and the further complication of many users now working from home, the solutions fall short. Ray Baum's Act states that when a 911 call is placed, the call must include a "dispatchable location." A dispatchable location refers to the street address and city associated with the 911 emergency caller along with further defining factors, such as building, floor or room number etc. In other words, Ray Baum's Act requires that the 911 operator be given enough information to find the location of the emergency call. Thus, to comply, each user, without a DID (each non-DID caller), needs to be able to be identified, provided a unique valid address and given a "call-back" mechanism that reliably re-connects dropped emergency calls back to their unique seat, station or non-DID extension.

Accordingly, some embodiments of the present inventive concept provide methods, systems and computer program products to provide a call back number for a non-DID caller. In some embodiments, a three step process is used to set up a system to allocate call back TNs to the non-DID callers. First, a provisioning setup should be performed, which involves collecting information from the customer and provisioning the collected information within a Control function (discussed below), Emergency Call Application Programming Interface (ECAPI) and Voice Application Programming Interface (API).

For background, ECAPI is a service where 911 call control is executed via an API into a Carrier (Bandwidth) 911 Dynamic Location Routing (DLR) account. First, within the DLR account a set of endpoint records ("users") and geolocations ("addresses") are provisioned. For the account, an "SOS-Number" or regular NANP telephone number is assigned. For all calls that are received at the SOS-Number, the ECAPI service sends a "GET" (call-back) to the account owner's HTTPS Uniform Resource Identifier (URI) service listed on the account. The account owner replies with the DLR endpoint and geolocations records to be used to determine a destination public safety access point (PSAP) and forwards the received call to that PSAP destination. The pertinent data from the endpoint and geolocation records are then presented to the PSAP Call Taker (operator), such as username, call back number and civic address.

A Voice API is a service that allows for general API control over in-bound and out-bound VOIP call legs as well as other services such as call recording, transcription, and bridge management. One or more session initiation protocol (SIP) peer connections and/or one or more NANP telephone numbers can be assigned to the account. Voice traffic that arrives on the account prompts one of several API call-back responses to be sent to the account owner. The Voice API thereby allows the account owner to perform call control such as to add a call leg, connect a call leg, or create new call legs (for example). It will be understood that embodiments of the present inventive concept further includes algorithms and systems that control the ECAPI and the Voice API to accomplish the intended method of providing a call back number to a non-DID caller. These algorithms interact with Carrier (Bandwidth) 911 Access services via both provisioning and call control APIs.

As used herein, a "Control function" refers to these algorithms and systems. In particular, the Control function presents an algorithm and set of programming instructions that control both the ECAPI and the Voice API. The customer is responsible for establishing the users' identifiers, such as "seats" or "extensions" and collecting from each user their current geolocation, which is generally a civic address for the purposes of 911. These geolocations (civic addresses) are stored via API with the Carrier (Bandwidth) in the DLR account. However, the user-identifiers, such as seats or extensions, are not stored within the DLR account because they are proprietary, of any format, and are not an NANP designation. The Control function will be responsible for managing the translation of non-DID "seats" to temporary TN-based identifiers for a given 911 call as will be discussed further herein.

Once the provisioning is complete, a 911 call from a non-DID number may be initiated focusing on the designation of the current location of the caller and the establishment of a future "call back" telephone number to be used in case the emergency call is dropped or the caller hangs up. Once the 911 operator has the call back number, a "call back" call may be placed by the 911 operator from the PSAP. The Control function is able to steer the call back to the original 911 caller (or "seat" or "extension") that made the original 911 call. In summary, some embodiments of the present inventive concept allow for allocation of a call back number to a non-DID caller by (1) provisioning setup, (2) the emergency call itself with key steps to allow a successful call-back and, finally, (3) the call-back itself at a time after the original emergency call is ended (for any reason). Accordingly, embodiments of the present inventive concept may provide a call back TN for non-DID callers that don't suffer from the deficiencies of the existing systems as will be discussed further below.

It will be understood that as used herein, the user/caller refers to a 911 emergency caller. Furthermore, a 911 operator, 911 call taker, PSAP call taker and the like all refer to the public safety personnel who receive the 911 emergency call and get the caller the help he or she needs.

It will be understood that embodiments of the present inventive concept may be applied to any user making a 911 call from a non-DID device. This includes a user making a 911 emergency call on a legacy Multi-Line Telephone System (MLTS) system. In some embodiments, the location information is unknown to the legacy MLTS and, therefore, embodiments of the present inventive concept locate the correct information and provide that correct information to the public safety personnel as will be discussed further herein.

As used herein, "MLTS" refers to MLTS as defined by the Federal Communication Commission (FCC) and is inclusive of terms such as Private Branch Exchange (PBX), enterprise communication system (ECS) enterprise phone system, office phone system, soft-PBX or similar terminology without departing from the scope of the present inventive concept. Thus, throughout the specification, when MLTS is referred to, one or more of these items may be included. Furthermore, some embodiments of the present inventive concept relate to all MLTSs and/or cloud-based MLTSs making use of the VOIP 911 calling services. Some brands of such MLTSs include, but are not limited to, Asterisk; Avaya; Broadworks; Cisco Call Manager; FreePBX; FreeSwitch; GENBAND; MetaSwitch; Mitel; NetSapiens; ShorTel; 3CX and the like.

Enhanced emergency calling, or "E911", services currently exist and are in use. E911 for Voice over IP (VoIP) is based on the North American Emergency Number Association standard "NENA 008-001." This specification is titled "NENA Interim VOIP Architecture for Enhanced 9-1-1 Service (12)." It was first released in 2005 and updated and republished in 2010. Services for VoIP 911 that are based on this standard are commonly referred to as "i2 services" or "VoIP Position Center (VPC) services". These names are all essentially synonymous with "VoIP 911," which will be used throughout the current specification and will be considered as inclusive of all the aforementioned citations.

Providers of VoIP 911 services must comply with all 911 regulations. Two significant 911 regulations are Section 506 of Ray Baum's Act, discussed above, and Kari's Law. Ray Baum's Act states that when a 911 call is placed, the call must include a "dispatchable location." A dispatchable location refers to the street address and city associated with the 911 emergency caller along with further defining factors, such as building, floor or room number etc. In other words, Ray Baum's Act requires that the 911 operator be given enough information to find the location of the emergency call. Kari's Law requires direct 911 dialing and notification capabilities in the MLTS, which are typically found in enterprises such as office buildings, campuses, hotels and the like. More specifically, Kari's Law stipulates that a notification (Kari's Law Notification) must be provided to persons at an enterprise, for example, at the front desk, security desk etc., when a 911 call is made from the building using the building's MLTS and that the location of the 911 emergency caller be correctly disclosed to the persons at the enterprise. Details with respect to MLTS is discussed in commonly assigned U.S. Pat. No. 11,159,676, entitled Methods for Emergency Response Location (ERL) Correction In A Voice over Internet Protocol (VoIP) 911 Server and related Systems and Computer Program Products, the disclosure of which is hereby incorporated herein by reference as if set forth in its entirety.

Figure 2:
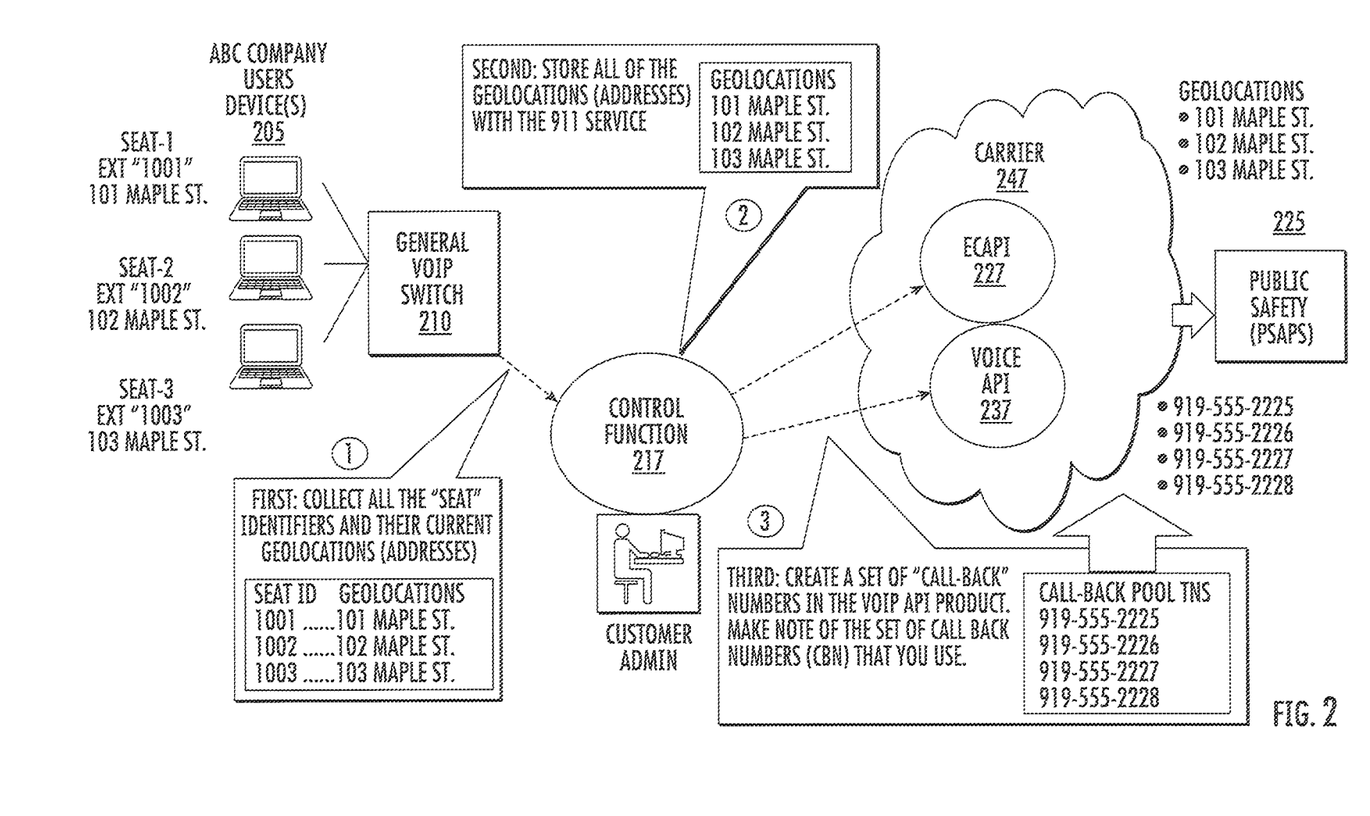
FIG. 2 is a block diagram illustrating provisioning of a system for non-DID call back in accordance with some embodiments of the present inventive concept.

Referring now to FIG. 2, a diagram illustrating methods for provisioning the system will be discussed. To establish emergency calling for non-DID "seats" or "extensions," data is collected associated with the users, for example, the users of the non-DID devices. For each individual user, a user and associated identifier will be collected and stored, for example, in the Control function. These identifiers are customizable and only must be consistently associated with the same user or set of users. In other words, this step identifies the users in the same way that they are identified as users within your internal VOIP Call Server or PBX. This information is used to generate an internal 911 call using a user's identifier as it appears in the SIP Invite as contained (proprietarily) in the "FROM" or "P-Asserted" field as will be discussed further below.

For example, if you are using a generic PBX where extensions are identified by an internal four-digit value, then this four-digit value is used as the user identifier. Alternatively, if your internal VOIP Server uses a SIP Invite format identifying the caller with a URL, such as UserName@MyCompany.com, then the "UserName" portion of this URL string becomes the unique user identifier.

As illustrated in FIG. 2, ABC Company assigns a four digit identifier to each user device 205 or "seat." The user devices 205, such as a personal computer (PC), a mobile device such as smartphone, laptop, VoIP phone, IoT device, or another telephonic device, the VoIP network. The VoIP network may be provided by a group of technologies and is a method for the delivery of voice communications and multimedia sessions over Internet Protocol (IP) networks, such as the Internet. The terms Internet telephony, broadband telephony, and broadband phone service specifically refer to the provisioning of communications services (voice, facsimile, short message service (SMS), voice-messaging and the like) over the Internet, rather than via the public switched telephone network (PSTN). The PSTN network is an aggregate of the world's circuit-switched telephone networks that are operated by national, regional, or local telephone operators, providing infrastructure and services for public telecommunication. The network discussed herein may be any combination of wired and/or wireless networks, including without limitation a direct interconnection, secured custom connection, private network (e.g., an enterprise intranet), public network (e.g., the Internet), personal area network (PAN), local area network (LAN), metropolitan area network (MAN), operating missions as nodes on the Internet (OMNI), wireless area network (WAN), wireless network (e.g., 802.11 WiFi), cellular network, and other communications networks.

Referring again to FIG. 2, the four-digit numbers ("1001", "1002", "1003") or extensions are used as the user identifier that uniquely identifies the seat/extension (Seat-1, Seat-2 and Seat-3). Then, for each of the users ("1001", "1002" and "1003"), the Control function collects the location (e.g., civic address—103 Maple St.) associated with that user (four-digit identifier) (1). This process of collecting data and storing it within, for example, the Control function is a proprietary process that may be managed by a person, for example, an employee of ABC company. This data may be used in multiple ways by the Control function. For example, the collected data may be used to correctly provision valid locations with the ECAP service and to maintain context between a user's emergency call, the internal SIP identifier of that user and the assignment of a temporary call-back number which replaces the user's non-DID identifier in the downstream call path as will be discussed further below.

Once the users' identifiers and physical location data is collected and stored at the Control function (2), all of the location data is provisioned with the ECAPI 227 service located in the Carrier network 247, for example, Bandwidth's network. The Control function 217 uses the provisioning API 237 of the ECAPI 227 service to upload each user's location. The ECAPI service 227 runs "on top of" the DLR service. The provisioning of records is therefore into the DLR account corresponding to the ECAPI service 227. The provisioning API 237 creates a new "Geolocation Record" for the address, for example, "102 Maple St." The requirement of RAY BAUM's Act of a "dispatchable location" is fulfilled with the inclusion of floor-level or room-level data. For example, geolocation record may indicate "Suite A" which will also be displayed to the 911 operator at the time of an emergency call.

The ECAPI service 227 validates and stores the provided location data as geolocation records with the Carrier. Each Geolocation Record contains, not only the validated civic addresses, but also the geolocation's latitude-longitude and validated master street address guide (MSAG), which is used by public safety. MASG is a unique legacy address format used by municipalities and 911 PSAPs. These geolocation records form a "pool" for future use. When a future emergency call arrives at the ECAPI service 227, a query is sent to the Control function 217 asking for the previously stored correct geolocation record to use to determine what the correct destination PSAP 225 is as well as what correct validated MSAG address to display to the PSAP screen.

During creation of the geolocation records, identifiers are stored in the Control function 217 for future reference during a call. In some embodiments, the format of the identifying string may be alpha-numeric and up to 32 characters. In this example, the geolocation record for the user at extension "1002" is named "User1002locationid". Furthermore, in this example, at least one ECAPI "AEUI Endpoint" record is needed. The AEUI endpoint record may contain the company name that is to be displayed to the PSAP screen when a 911 call is made. In this example, the users are all part of "ABC Company" and the AEUI identifier is "ABCCompany" for simplicity. In some embodiments, these details may be provisioned in the DLR manually.

Finally, as illustrated in FIG. 2, once all the data has been processed and stored in the correct locations, a set of "Call Back Numbers" (Call-Back Pool TNs) is established to use during a future emergency call. Since each non-DID caller does not have a unique TN with which to call, a temporary "proxy" number is used during the emergency call instead. A PSAP Call Taker (operator) screen can only display a true TN, it cannot display four-digit extension values or a "User-Name" string. Hence, a pool of call-back numbers is needed and provisioned within the Voice API service 237. At the time of the emergency call from a non-DID seat (Seat-1, Seat-2, Seat-3 . . . ), one of the call-back numbers is selected from the pool by the Control function 217 to be displayed to the PSAP 225 as a proxy instead of the internal "seat" identifier. If a member of public safety needs to call the proxy Call Back Number, that call will arrive at the Voice API service 237 and be under the control of the Control function 217 where that "call-back" call can be forwarded to the 911 caller as will be discussed further below.

As illustrated in FIG. 2, the pool of call-back numbers in this example may include:
919-555-2225
919-555-2226
919-555-2227
919-555-2228

These numbers are provided as examples only and, therefore, it is understood that embodiments of the present inventive concept are not limited thereto.

It will be understood that the provisioning method discussed above with respect to FIG. 2 is provided as an example only. Accordingly, information can be stored and processed at different locations, different types of information may be stored and processed and the like without departing from the scope of the present inventive concept.

Furthermore, a Generic VoIP server and Carrier services are discussed above. In accordance with some embodiments of the present inventive concept, it is important to note that there are two separate SIP connections between the customer's Generic VOIP server and the carrier services. The 911 call and the call-back call are transported by two different and separate SIP connections. For the 911 call, a dedicated SIP peer connection is established between the Generic VOIP server and Carrier 911-only SBCs, this is a 911-only connection that is typical of most 911 deployments. The 911-call arrives at the 911-only SBC and be processed directly by the ECAPI service (this is different than a "typical" ECAPI connection that passes through the PSTN and arrives at the Carrier Voice network edge SBCs). Meanwhile, the call-back path is a separate SIP connection established between the Voice API (Programmable Voice account) and the Generic VOIP server. As a result of using two different connections, the 911-call source URI and IP addresses must be remembered by the Control function and used later to correctly route the call-back call to the Generic VOIP server destination "seat". Below an IP address of "124.124.124.124" is used as an example of the destination address for the 911 call and the IP address "123.123.123.123" is used as an example of the origination address for the 911 call. It will be seen that for the call-back call, these two addresses change places in the return call SIP Invite.

Figure 3:
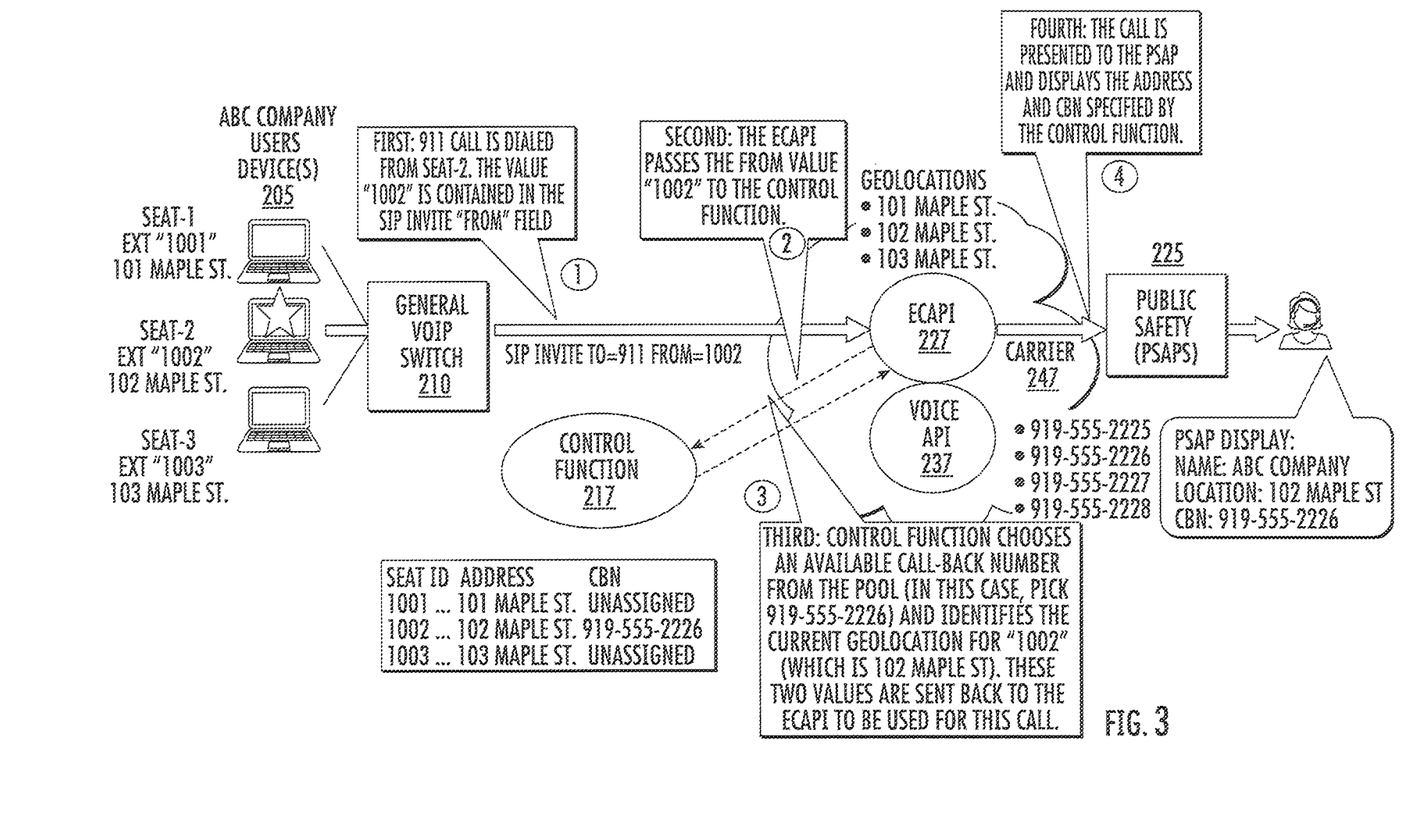
FIG. 3 is a block diagram illustrating an emergency call initiated by a non-DID caller in accordance with some embodiments of the present inventive concept.

Referring now to FIG. 3, once the provisioning discussed above with respect to FIG. 2 is complete, an emergency call is made by a user from a non-DID device. It is understood that that the user's device, such as a SIP User Agent, an OTT calling app, a hard-phone extension, or some other service, has no knowledge of the civic address where the user is calling from. The user's emergency call relies on the data stored in the Control function 217 during provisioning and its logic to ensure that the emergency call arrives at the correct destination PSAP 225 and displays to the 911 operator. The valid civic (MSAG) address and a (temporary) Call Back Number can be used to reconnect with the non-DID caller should the connection drop.

An emergency call process from a non-DID device will now be discussed with respect to FIG. 3. As illustrated, the emergency caller (user) identified by extension "1002" dials the digits "911" as indicated by the star on the middled device 205. The general VOIP server 210 is configured to send all "911" traffic to the carrier ECAPI service 227 (1). As discussed above, the connection between the generic VOIP server 210 and Carrier is a SIP peer connection with the sending and receiving IP address exchanged and whitelisted on each party's respective SBC. "White listing" refers to a list of approved entities such that these entities can send and receive data from each other without being filtered. The generic VOIP server 210 is further configured so that the digits "911" are call-forward to a specific TN (called the "SOS Number") that invokes the ECAPI service 227. In this example, an SOS-Number of 800-555-1234 which is a toll-free number will be used.

As a result, when the user "1002" dials the digits "911" a SIP Invite is sent to the ECAPI service 227 with the "FROM" field set to the digits "1002." The "TO" field will be set to the SOS-Number with the value 800-555-1234. The ECAPI 227 receives this emergency call SIP Invite as illustrated in FIG. 3.

Once the 911 call is dialed from the non-DID number (e.g. Seat-2-1002) and the value 1002 is sent in the SIP invite (1), the ECAPI service 227 informs the Control function 217 that a new emergency call has arrived (2). As illustrated, in these embodiments, the ECAPI 227 passes the contents of the FROM field to the Control function 217 as indicated by the dotted arrows between the ECAPI 227 and the Control function 217, which are the digits "1002." In the command, the called_number is the SOS-Number (800-555-1234) and the calling_number is the digits "1002".

Once the control function 217 receives the command, the control function 217 provides call treatment instructions for the call. In particular, the control function 217 instructs the ECAPI 227 what data to use for this emergency call Including (1) the AEUI endpoint record, (2) the Geolocation Record identifier for user "1002" and (3) what call back number to use. For simplicity in this example, there is a single AEUI for all of ABC Company's users with the identifier "ABCCompany." Furthermore, the control function 217 has retained the information of the current location of user "1002" and has stored that in the Geolocation Record under the identifier "User1002locationid." Finally, the control function 217 selects a "proxy" TN from the previously created pool and selects that TN "9195552226" (3). The control function 217 retains the relationship between this selected TN and the user "1002." If a call-back call arrives on this TN, it is forwarded to the user at extension "1002".

Using this information, the ECAPI 227 routes the non-DID emergency call to the correct destination PSAP 225 (4). The ECAPI 227 displays to the PSAP screen, the "name" stored in the AEUI record "ABCCompany" which is ostensibly the name "ABC Company" as well as the address data "102 Maple St" as well as the call-back number 919-555-2226. The 911 operator can now assist user "1002" with their emergency. Should the completed call drop for any reason, the 911 operator can dial the displayed call-back number to reconnect the call as will be discussed below.

Figure 4:
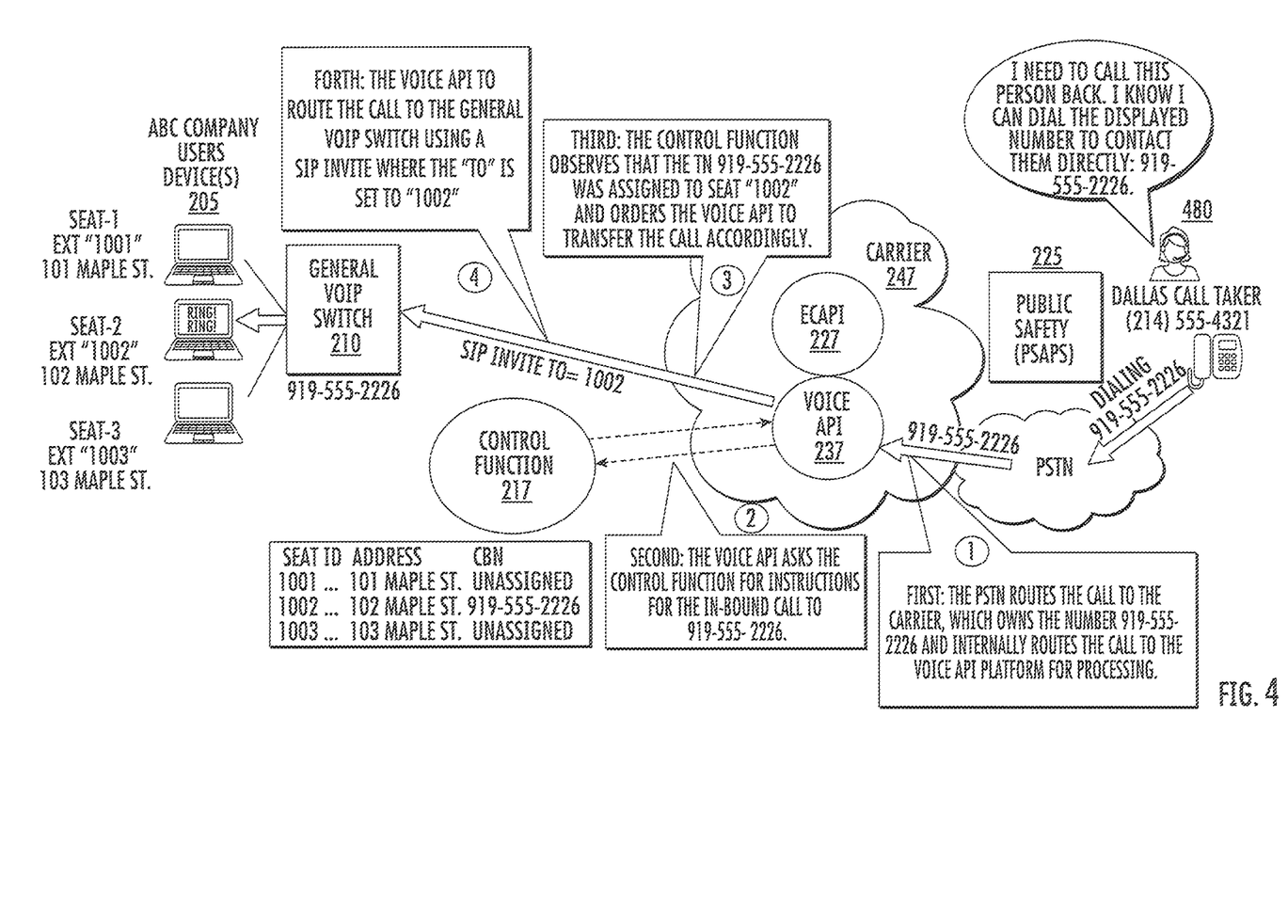
FIG. 4 is a block diagram illustrating a call-back process for a non-DID emergency caller in accordance with some embodiments of the present inventive concept.

Referring now to FIG. 4, the 911 operator, here a Dallas Call Taker 480, interacts with distressed callers through the voice connection of the emergency call. When a call ends, for any reason, the Call Taker 480 can elect to reconnect by dialing the Call Back Number (CBN) displayed on the screen at the time of the original call. In this example, the user is a non-DID caller that does not have a designated TN. The user is a "seat" with an extension (1002) and there is no way to display an extension value on the screen of the PSAP. Instead, in accordance with embodiments of the present inventive concept, a temporary CBN (with value 919-555-2226) was selected for this user and displayed instead. The control function 217 now controls how the call-back call is identified and routed correctly back to the correct user at extension 1002.

As illustrated in FIG. 4, the Dallas Call Taker 480 observes the call back number on the display of the console: 919-555-2226. The Dallas Call Taker 480 decides to call the 911 caller and dials the 919-555-2226 number as a normal PSTN call. This call-back can be originated (dialed) on any telecom carrier's service, such as AT&T, Windstream or even a mobile service provider such as Verizon Wireless. In this example, the Dallas Call Taker 480 is located in Dallas and their desk phone has the TN 214-555-4321 as illustrated in FIG. 4. The call-back call proceeds to be routed through the PSTN and arrives at the owner of the number which is the Carrier 247 (1), for example, Bandwidth. The Carrier 247 observes that the called TN (919-555-2226) resides on the Voice API platform 237 and internally routes the call-back call to the correct account instance for processing. The call from the Dallas Call Taker at 214-555-4321 arrives at the Voice API 237 because this is where all four call-back pool numbers with the range of 919-555-2225 to 919-555-2228 were provisioned as discussed above with respect to FIG. 2.

The call-back call from 214-555-4321 and going to 919-555-2226 arrives at the Voice API platform 237. The Voice API service 237 launches, for example, a webhook POST to the control function 217 indicating that a call has arrived and instructions are needed to process the call (2).

The Control function 217 receives the above POST informing it of the arrived call. The Control function looks up the current state of the TN in the call-back pool. The current state of the TN 919-555-2226 is that it was recently used as the CBN to be displayed for an emergency call from seat "1002." Any call to this TN is assumed to be a call-back call to the original caller at seat "1002." The control function 217 instructs the Voice API 237 to transfer this "call-back" call to "1002@mycompany.com" (3).

In response, the Voice API 237 performs the call transfer to the destination seat "1002" (1002@mycompany.com) and launches a SIP Invite to the destinated generic VOIP server 210 with the appropriate TO and FROM fields (4). The above SIP Invite will arrive at the seat "1002" with Calling Line ID (ANI) of the PSAP Call Taker in Dallas having the phone number 214-555-4321. It will be understood that comparing the above "call-back" SIP Invite to the original emergency call SIP Invite discussed above that the originating and termination IP addresses are reversed. In other words, the return call is going back to the original emergency caller's IP source address (123.123.123.123) which was "remembered" by the control function for this purpose.

Accordingly, as discussed briefly above, embodiments of the present inventive concept provide a method and system to provide a call-back number for a non-DID emergency caller. The construction of a control function provides the ability to receive an emergency call from a non-DID seat at a generic VOIP server. The non-DID identifier of the emergency call is passed to the Control function from the ECAPI service, and the control function specifies both a location and a CBN to be used for processing the call. The ECAPI processes the emergency call as instructed and routes the call to the PSAP and displays the CBN. At a point in the future, when that CBN is dialed, the call-back call is received by the Voice API service and the control function is informed. The control function consults its state machine and, seeing that the call-back call should be transferred back to the original seat, instructs the Voice API to perform the transfer. The user at the seat can successfully make emergency calls and receive calls directly back from public safety despite the user not having a unique TN of their own.

Figure 5:
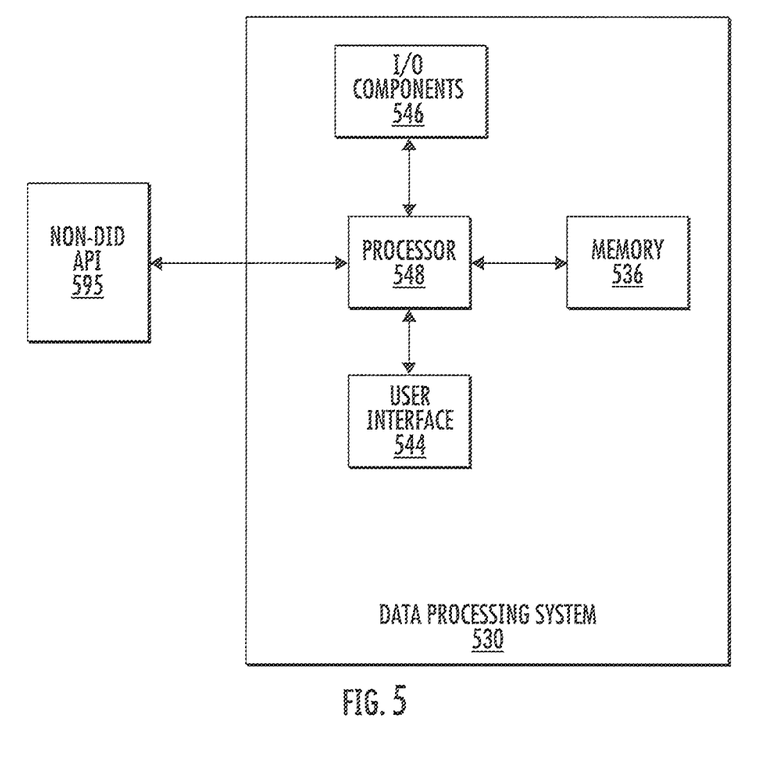
FIG. 5 is a high level block diagram of a data processing system for use with an Non-DID API module in accordance with some embodiments of the present inventive concept.

Referring now to FIG. 5, an example of a data processing system 530 suitable for use with any of the examples described above. Although the example data processing system 530 is shown as in communication with the Non-DID API 595 in accordance with embodiments of the present inventive concept, the data processing system 630 may also be part of the API 595 or in any other component of the system without departing from the scope of the present inventive concept. In some examples, the data processing system 530 can be any suitable computing device for performing operations according to the embodiments discussed herein described herein.

As illustrated, the data processing system 530 includes a processor 548 communicatively coupled to I/O components 546, a user interface 544 and a memory 536. The processor 548 can include one or more commercially available processors, embedded processors, secure processors, microprocessors, dual microprocessors, multi-core processors, other multi-processor architectures, another suitable processing device, or any combination of these. The memory 536, which can be any suitable tangible (and non-transitory) computer-readable medium such as random access memory (RAM), read-only memory (ROM), erasable and electronically programmable read-only memory (EEPROMs), or the like, embodies program components that configure operation of the data processing system 530.

I/O components 546 may be used to facilitate wired or wireless connections to devices such as one or more displays, game controllers, keyboards, mice, joysticks, cameras, buttons, speakers, microphones and/or other hardware used to input or output data. Memory 536 represents non-volatile storages such as magnetic, optical, or other storage media included in the data processing system and/or coupled to processor 548.

The user interface 544 may include, for example, a keyboard, keypad, touchpad, voice activation circuit, display or the like and the processor 548 may execute program code or instructions stored in memory 536.

It should be appreciated that data processing system 530 may also include additional processors, additional storage, and a computer-readable medium (not shown). The processor(s) 548 may execute additional computer-executable program instructions stored in memory 536. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

As briefly discussed above, some embodiments of the present inventive concept provide a solution for correctly identifying the location of an employee working from home responsive to a VoIP 911 emergency call. By intercepting the Kari's Law notification at the VOIP server and using the extension or the DID number to lookup the work from home address, embodiments of the present inventive concept are able to provide a correct location to 911 emergency services. Furthermore, all of this is accomplished without significant hardware and/or software upgrades to the existing system.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

That which is claimed is:

1. A method for providing a call-back number for emergency calls initiated from a non-DID (direct inward dialing) device where at least some of the non-DID devices are positioned at different physical locations, the method comprising:
   receiving a call from a public safety answering point (PSAP) at an application programming interface (API) associated with a carrier, wherein a PSAP operator calls a proxy call-back number on a PSAP screen that has been previously assigned to one of the non-DID devices, wherein the proxy call-back number is selected from a set of proxy call-back numbers created for use with emergency calls initiated from non-DID devices in the different physical locations;
   requesting instructions at the API from a control function that includes the proxy number dialed by the PSAP operator being used and a specific location of the non-DID device from a set of possible physical locations of all non-DID devices;
   receiving information including the specific location of the non-DID device at a time of an emergency call and a name of a caller at the API related to the non-DID device from the control function based on pre-provisioned data associated with the proxy call-back number; and
   routing the call from the PSAP to the non-DID device through a voice over internet protocol (VOIP) switch.

2. The method of claim 1, wherein receiving the call from the PSAP comprises receiving the call at a PSTN (Public Switched Telephone Network) from the PSAP and routing the call from the PSTN to the API of the carrier.

3. The method of claim 1, wherein routing the call from the PSAP to the non-DID device through the VOIP switch comprises routing the call using a session initiation protocol (SIP) invite wherein a TO field in the SIP invite is set to a user identifier associated with the proxy number.

4. The method of claim 1, wherein routing is followed by connecting the call from the PSAP with the non-DID device.

5. The method of claim 1, further comprising pre-provisioning data at the control function to facilitate providing a call-back number for a non-DID device, wherein pre-provisioning comprises:
   assigning a unique identifier and a corresponding geolocation to each non-DID device;
   providing assigned unique identifiers and geolocations to the control function;
   storing the unique identifiers and the corresponding geolocations at the control function;

provisioning the stored unique identifiers and geolocations at the carrier; and creating and storing the set of proxy call-back numbers at the API of the carrier, the set of proxy call-back numbers to be used for future emergency calls initiated from non-DID numbers.

6. The method of claim 5, wherein provisioning the stored unique identifiers and corresponding geolocations comprises provisioning the stored unique identifiers and the corresponding geolocations at an ECAPI (Emergency Call Application Programming Interface) at the carrier.

7. The method of claim 5, wherein pre-provisioning is followed by and receiving the call from the PSAP is preceded by:

receiving an emergency call at the carrier from the VOIP switch using a SIP invite, the non-DID device having a unique identifier and corresponding geolocation assigned thereto;

obtaining the proxy call-back number from the set of proxy call-back numbers and assigning the proxy call-back number to the emergency call having the unique identifier and corresponding geolocation; and providing the call to the PSAP operator and displaying the geolocation and the assigned proxy call-back number to the PSAP operator.

8. At least one machine-readable non-transitory medium comprising a set of instructions executable on a computing device to cause the computing device to provide a call-back number for emergency calls initiated from a non-DID (direct inward dialing) device where at least some of the non-DID devices are positioned at different physical locations by:

receiving a call from a public safety answering point (PSAP) at an application programming interface (API) associated with a carrier, wherein a PSAP operator calls a proxy call-back number on a PSAP screen that has been previously assigned to one of the non-DID devices, wherein the proxy call-back number is selected from a set of proxy call-back numbers created for use with emergency calls initiated from non-DID devices in the different physical locations;

requesting instructions at the API from a control function that includes the proxy number dialed by the PSAP operator being used and a specific location of the non-DID device from a set of possible physical locations of all non-DID devices;

receiving information including the specific location of the non-DID device at a time of an emergency call and a name of a caller at the API related to the non-DID device from the control function based on pre-provisioned data associated with the proxy call-back number; and routing the call from the PSAP to the non-DID device through a voice over internet protocol (VOIP) switch.

9. The at least one machine-readable non-transitory medium of claim 8, wherein the set of instructions executable on a computing device further causes the computing device to receive the call at a PSTN (Public Switched Telephone Network) from the PSAP and routing the call from the PSTN to the API of the carrier.

10. The at least one machine-readable non-transitory medium of claim 8, wherein the set of instructions executable on a computing device further causes the computing device to route the call using a session initiation protocol (SIP) invite wherein a TO field in the SIP invite is set to a user identifier associated with the proxy number.

11. The at least one machine-readable non-transitory medium of claim 8, wherein the set of instructions executable on a computing device further causes the computing device to connect the call from the PSAP with the non-DID device.

12. The at least one machine-readable non-transitory medium of claim 8, wherein the set of instructions executable on a computing device further causes the computing device to pre-provision data at the control function to facilitate providing a call-back number for a non-DID device by:

assigning a unique identifier and a corresponding geolocation to each non-DID device;

providing assigned unique identifiers and geolocations to the control function;

storing the unique identifiers and the corresponding geolocations at the control function;

provisioning the stored unique identifiers and geolocations at the carrier; and creating and storing the set of proxy call-back numbers at the API of the carrier, the set of proxy call-back numbers to be used for future emergency calls initiated from non-DID numbers.

13. The at least one machine-readable non-transitory medium of claim 12, wherein the set of instructions executable on a computing device further causes the computing device to provision the stored unique identifiers and corresponding geolocations comprises provisioning the stored unique identifiers and the corresponding geolocations at an ECAPI (Emergency Call Application Programming Interface) at the carrier.

14. The at least one machine-readable non-transitory medium of claim 12, wherein the set of instructions executable on a computing device further causes the computing device to:

receive an emergency call at the carrier from the VOIP switch using a SIP invite, the non-DID device having a unique identifier and corresponding geolocation assigned thereto;

obtain the proxy call-back number from the set of proxy call-back numbers and assigning the proxy call-back number to the emergency call having the unique identifier and corresponding geolocation; and provide the call to the PSAP operator and display the geolocation and the assigned proxy call-back number to the PSAP operator.

15. A system for providing a call-back number for emergency calls initiated from a non-DID (direct inward dialing) device where at least some of the non-DID devices are positioned at different physical locations, the system comprising an application programming interface that:

receives a call from a public safety answering point (PSAP) associated with a carrier, wherein a PSAP operator calls a proxy call-back number on a PSAP screen that has been previously assigned to one of the non-DID devices, wherein the proxy call-back number is selected from a set of proxy call-back numbers created for use with emergency calls initiated from non-DID devices in the different physical locations;

requests instructions from a control function that includes the proxy number dialed by the PSAP operator being used and a specific location of the non-DID device from a set of possible physical locations of all non-DID devices;

receives information including the specific location of the non-DID device at a time of an emergency call and a name of a caller at the API related to the non-DID device from the control function based on pre-provisioned data associated with the proxy call-back number; and routes the call from the PSAP to the non-DID device through a voice over internet protocol (VOIP) switch.

16. The system of claim 15, wherein the API receives the call from the PSAP through a PSTN (Public Switched Telephone Network), wherein the PSTN routes the call from the PSTN to the API.

17. The system of claim 15, wherein the API further routes the call using a session initiation protocol (SIP) invite wherein a TO field in the SIP invite is set to a user identifier associated with the proxy number.

18. The system of claim 15, further comprising a control function that pre-provisions data at to facilitate providing a call-back number for a non-DID device, wherein the control function pre-provisions by:

assigning a unique identifier and a corresponding geolocation to each non-DID device;

providing assigned unique identifiers and geolocations to the control function;

storing the unique identifiers and the corresponding geolocations at the control function; provisioning the stored unique identifiers and geolocations at the carrier; and creating and storing the set of proxy call-back numbers at the API of the carrier, the set of proxy call-back numbers to be used for future emergency calls initiated from non-DID numbers.

19. The system of claim 18, where the system further comprises an ECAPI (Emergency Call Application Programming Interface) at the carrier that is provisioned with the stored unique identifiers and the corresponding geolocations at an ECAPI.

20. The system of claim 18, wherein the API further:

receive an emergency call at the carrier from the VOIP switch using a SIP invite, the non-DID device having a unique identifier and corresponding geolocation assigned thereto;

obtains the proxy call-back number from the set of proxy call-back numbers and assigning the proxy call-back number to the emergency call having the unique identifier and corresponding geolocation; and provides the call to the PSAP operator and displaying the geolocation and the assigned proxy call-back number to the PSAP operator.

* * * * *